United States Patent
Keller et al.

(10) Patent No.: US 6,449,813 B2
(45) Date of Patent: Sep. 17, 2002

(54) WORM-DRIVEN HOSE CLAMP

(75) Inventors: Werner Keller, Maintal; Stephan Mann, Bieber; Hartmut Redemann, Hanau; Willi Stichel, Maintal, all of (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/866,580

(22) Filed: May 25, 2001

(30) Foreign Application Priority Data

May 25, 2000 (DE) .......................... 100 26 020

(51) Int. Cl.⁷ ............................................... F16L 33/08
(52) U.S. Cl. ..................... 24/274 R; 24/20 R
(58) Field of Search ............................ 24/20 LS, 274 R, 24/274 P, 279, 274 WB

(56) References Cited

U.S. PATENT DOCUMENTS

| | | | |
|---|---|---|---|
| 3,900,932 A | * 8/1975 | Allert | 24/274 R |
| 3,950,830 A | * 4/1976 | Duprez | 24/274 R |
| 4,237,588 A | * 12/1980 | Rasmussen et al. | 24/274 R |
| 4,528,730 A | * 7/1985 | Spaulding | 24/274 R |
| 4,706,346 A | * 11/1987 | Verges | 24/274 R |
| 5,560,087 A | * 10/1996 | Marques | 24/278 R |
| 5,682,651 A | * 11/1997 | Sauer | 24/274 R |

FOREIGN PATENT DOCUMENTS

| | | | |
|---|---|---|---|
| DE | 2800824 | * | 7/1979 |
| DE | 2854676 | * | 6/1980 |
| DE | 298 18 193 U1 | * | 2/1999 |
| DE | 19633435 C | * | 8/2000 |

* cited by examiner

Primary Examiner—Robert J. Sandy
(74) Attorney, Agent, or Firm—Friedrich Kueffner

(57) ABSTRACT

A worm-driven hose clamp has a housing made of a band connected with interlocking cutout and projection to form an open butt joint. A clamping screw with a threaded shaft is arranged in the housing. The first and second ends of a clamping strip are overlappingly received in the housing. The first end has thread elements interacting with the threaded shaft. The second end is fastened to the housing bottom which has transverse edges extending transversely to the butt joint. The transverse edges have radially outwardly, circumferentially projecting tongues on opposite sides of the butt joint. The second end has openings on opposite sides of the butt joint for receiving the tongues. Depressions adjoin the openings. They project radially inwardly and extend longitudinally in a circumferential direction of the clamping strip away from the housing relative to the transverse edges. The tongues penetrate the openings and matchingly engage the depressions.

10 Claims, 4 Drawing Sheets

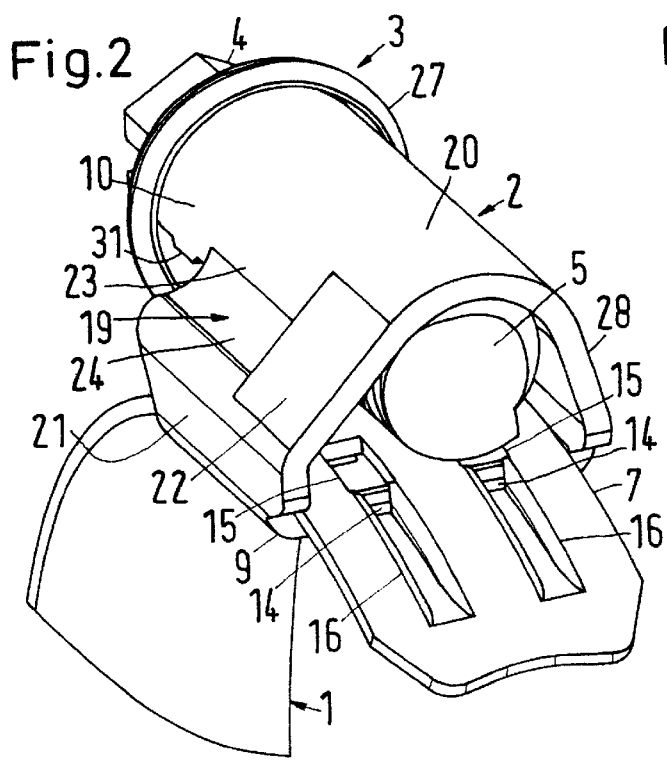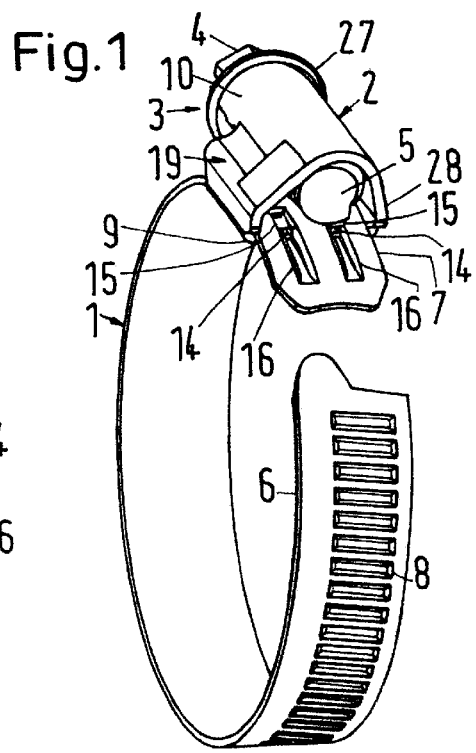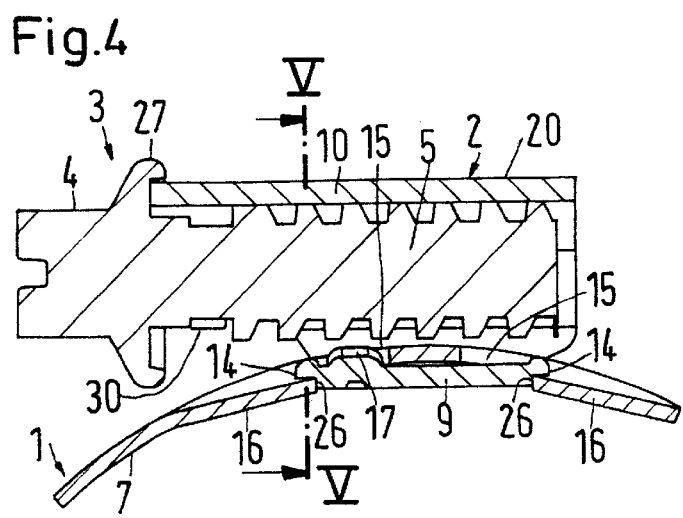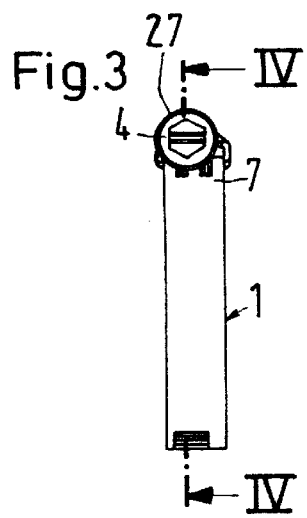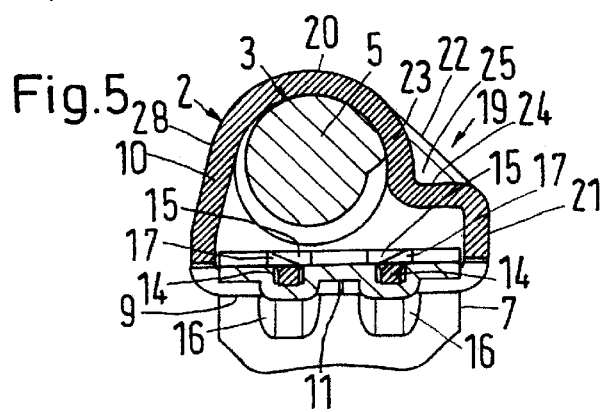

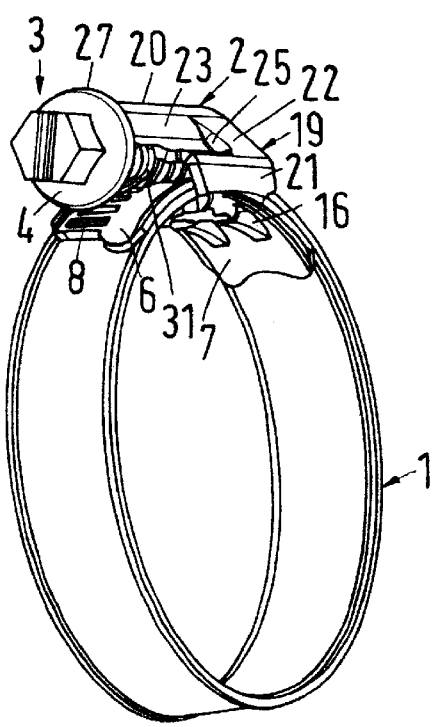
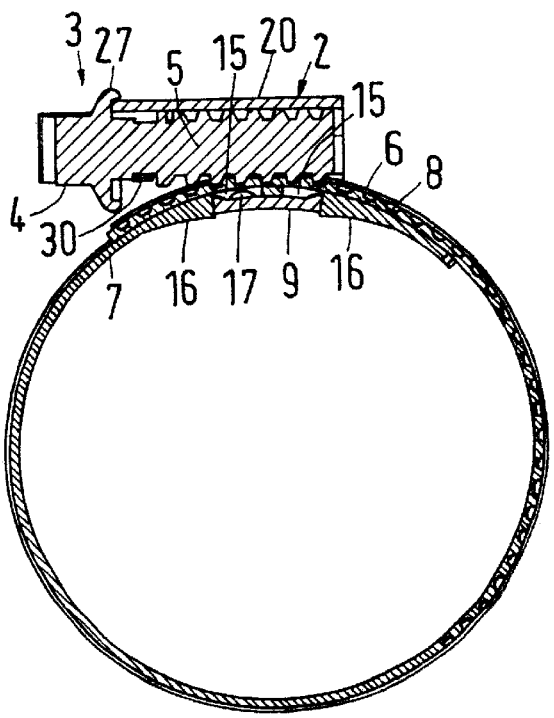
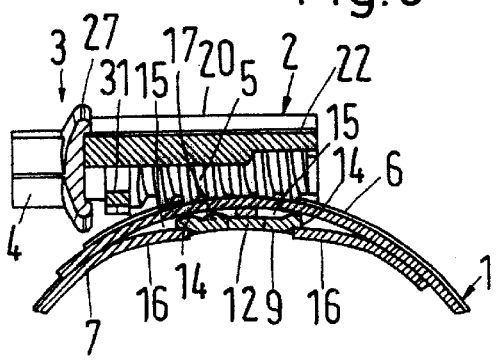
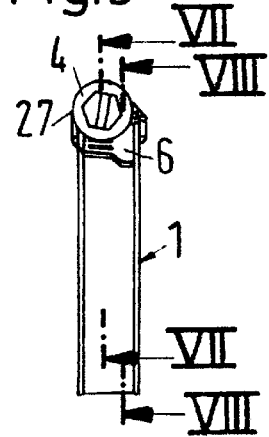

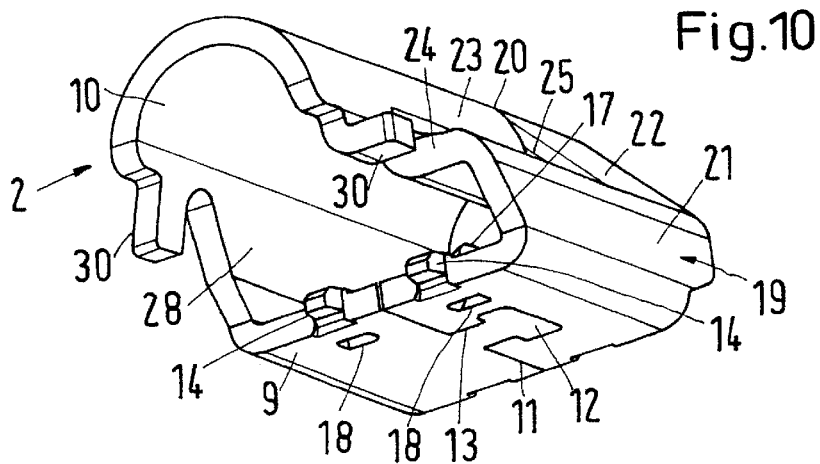
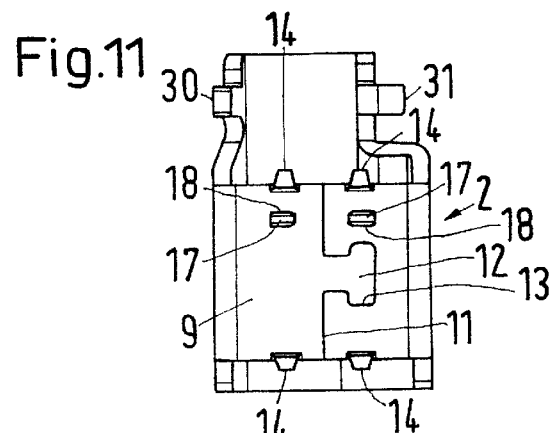
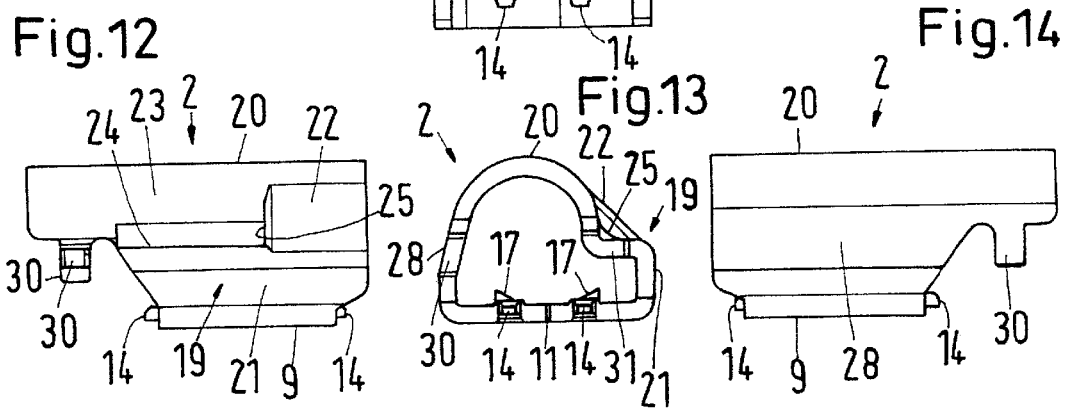
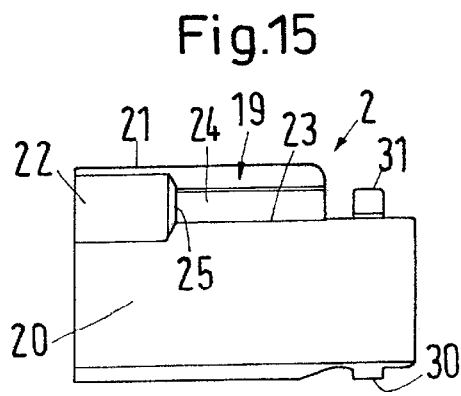

WORM-DRIVEN HOSE CLAMP

BACKGROUND OF THE INVENTION

1. Field of the Invention

The invention relates to a worm-driven hose clamp comprising a clamping strip, a housing, and a clamping screw comprising a head and a threaded shaft, wherein the clamping strip comprises overlapping end portions. The radially outwardly positioned one of the end portions is provided with thread elements which interact with the threaded shaft, and the radially inner end portion is positive-lockingly connected with the bottom of a housing surrounding the end portions and the threaded shaft of the clamping screw. The housing supports the clamping screw in both circumferential directions of the hose clamp. The housing is comprised of a housing band whose ends delimit an open butt joint in the area of the housing bottom and are connected to one another by interlocking undercuts of their edges defining the open butt joint. The bottom of the housing comprises at least on the transverse edge facing away from the head of the clamping screw, a radially outwardly angled tongue on both sides of the open butt joint. The tongue penetrates through an opening in the radially inwardly positioned end portion of the clamping strip.

2. Description of the Related Art

In a known worm-driven hose clamp of this kind (DE 196 33 435 C1) a single opening is formed at each transverse edge of the housing bottom in the form of a groove which is pressed radially outwardly and extends transverse to the strip. On each transverse edge the two tongues engage together the same opening wherein the tongues are positioned so as to laterally rest against one another. The tongues are provided to prevent spreading of the open butt joint from a central area, where the edges of the open butt joint are connected by positive-locking engagement of interlocking undercuts, toward the transverse edges of the housing bottom, in particular, in a direction toward the transverse edge positioned at the end where the head of the clamping screw is located.

This type of connection of the abutting ends of the housing band is able to withstand very high clamping forces. However, for even higher clamping forces there is the risk of deformation, in particular, of the area of the clamping strip opening positioned on the transverse edge of the housing bottom facing away from the head of the clamping screw, and there is still the risk of spreading of the open butt joint, particularly at the side of the screw head.

SUMMARY OF THE INVENTION

For a worm-driven hose clamp of the aforementioned kind, it is an object of the present invention to reduce the risk of deformation of the clamping strip and to configure the connection of the ends of the housing band in the area of the housing bottom so as to be even more stable.

In accordance with the present invention, this is achieved in that the tongues are oriented in the circumferential direction of the clamping strip and in that each tongue has correlated therewith its own opening having positioned adjacent thereto a radially inwardly pressed depression oriented away from the respective bottom edge in the circumferential direction of the clamping strip, wherein each depression is matchingly engaged by a tongue, respectively.

In this solution, at each transverse edge of the housing bottom there are two areas of radially free end faces of the neighboring depressions resting against the sides of each tongue and providing support surfaces, i.e., a total of four areas or support surfaces is provided at each transverse edge. These areas are subjected to a reduced surface pressure in comparison to only two areas provided on each transverse edge, as is the case in the known embodiment. Moreover, the spreading of the open butt joint on the housing bottom by the lateral deflection of the radially outer end portions of the clamping strip is prevented, in particular, on the side of the head of the clamping screw, up to even high clamping force since each tongue rests against a respective sidewall of the depression when one sidewall of the housing is loaded laterally (axially) in the direction of spreading of the open butt joint as a result of a force of the radially outer end portion of the clamping strip acting in the axial direction of the clamp. In the past, only one of the two adjacently positioned tongues was supported on the edge of the single opening receiving both tongues.

Preferably, it is ensured that the tongues are pressed away from the underside of the housing bottom radially outwardly. In this configuration, a stepped arrangement results at the transition from the housing bottom to the tongues. In this connection, the housing bottom can be supported underneath the tongues on the radially free end faces of the depressions in the circumferential direction of the hose clamp.

Moreover, it is beneficial when the housing bottom has on both sides of the open butt joint projections projecting past the inner side of the housing bottom which project into the openings positioned closest to the clamping screw head. These projections take up additional spreading forces and therefore also contribute to the stability of the housing bottom.

The projections can be formed by tabs formed between the legs of U-shaped cuts in the bottom and pressed out of the bottom plane. The tabs rest with their free ends against those edges of the openings positioned farthest away from the open butt joint, respectively. These tabs can receive especially high forces and can be formed in a simple way.

Moreover, it can be provided that the housing is provided only on its right side, which is defined when the clamping screw is positioned above the clamping strip and viewed from the head in the direction toward the threaded shaft of the clamping screw, with a lateral stabilizer portion whose wall comprises, in an area radially external to the radially outer end portion of the clamping strip adjacent to the free end of the clamping screw shaft, a wall portion extending from the rounded top of the housing tangentially to a radial wall portion of the lateral stabilizer portion and further comprises, adjacent to a central portion of the threaded shaft of the clamping screw, a curved wall portion resting against the threaded shaft and an axial wall portion connecting the curved wall portion with the radial wall portion. This lateral stabilizer portion prevents a lateral tilting of the housing in the rotational direction of the clamping screw. Its curved wall portion contributes to the guiding action of the clamping screw tangentially to the hose clamp. The slanted wall portion prevents widening of the curved wall portion and of the axial wall portion during clamping. At the same time, the slanted wall portion reduces the contact surface between the thread of the threaded shaft of the clamping screw and the wall of the housing so that the thread in the area of the slanted wall portion experiences reduced wear. The clamping screw can thus be rotated easily even after several actuations or rotations. Accordingly, the torque required for clamping the clamping screw remains minimal even for an extended service life.

The curved wall portion and the axial wall portion can be formed by pressing the sidewall of the housing inwardly so that a wall portion extending transversely to the clamping screw is formed between the slanted wall portion, the curved wall portion, and the axial wall portion. This imparts high stiffness to the sidewall of the lateral stabilizer portion against spreading.

Preferably, the plane of the transversely extending wall portion intercepts approximately the center of the section of the clamping screw engaging the clamping strip with its thread. In the area of the center of the section of the clamping screw engaging the clamping strip with its thread, the housing is subjected to especially high forces which have the tendency to widen the housing. In the described position, the transversely extending wall portion counters such a tendency for widening in a particularly beneficial way.

The corners of the housing end facing away from the head of the clamping screw are preferably rounded. This reduces the risk that the these corners will penetrate the material of an end section of a hose to be clamped onto a socket or pipe section and will thus damage the hose.

The radially outer corners of the free end of the tongues can be beveled. With such a configuration, they will not impair, as would be the case with right angle corners, the movement of the radially outer end of the clamping strip relative to the radially inner end.

Moreover, it is advantageous when the lower edge of the depressions are substantially aligned with the underside of the housing bottom and the depth of the depressions decreases continuously to zero from the end adjoining the opening, respectively, to the opposite end. In this embodiment, a substantially continuous edge-free transition between the housing bottom and the inner side of the clamping strip is provided with a correspondingly uniform radial pressing of a hose onto the circumference of a socket or pipe.

BRIEF DESCRIPTION OF THE DRAWING

In the drawing:

FIG. 1 is a perspective view of an embodiment of the worm-driven hose clamp according to the invention in the open state;

FIG. 2 is a detail on an enlarged scale of the worm-driven hose clamp according to FIG. 1;

FIG. 3 is a front view of the hose clamp according to FIG. 1 viewed from the head of the clamping screw;

FIG. 4 shows a cross-section IV—IV on an enlarged scale of the worm-driven hose clamp according to FIG. 3;

FIG. 5 shows the section V—V of FIG. 4;

FIG. 6 is another perspective view of the worm-driven hose clamp according to the invention in the closed state;

FIG. 7 shows the section VII—VII of the worm-driven hose clamp according to FIG. 9;

FIG. 8 shows a section VIII—VIII of the worm-driven hose clamp according to FIG. 9;

FIG. 9 is a view, on a reduced scale, of the worm-driven hose clamp according to the invention in the closed state, viewed in a direction from the head of the clamping screw;

FIG. 10 is a perspective view on an enlarged scale of the housing of the worm-driven hose clamp according to the invention;

FIG. 11 shows a bottom view of the housing of the worm-driven hose clamp on a scale slightly reduced relative to FIG. 10;

FIG. 12 shows a side view of the housing according to FIG. 11;

FIG. 13 is a front view of the housing according to FIG. 11;

FIG. 14 shows a different side view of the housing according to FIG. 11;

FIG. 15 is a plan view of the housing according to FIG. 11;

DESCRIPTION OF THE PREFERRED EMBODIMENTS

Figure 16:
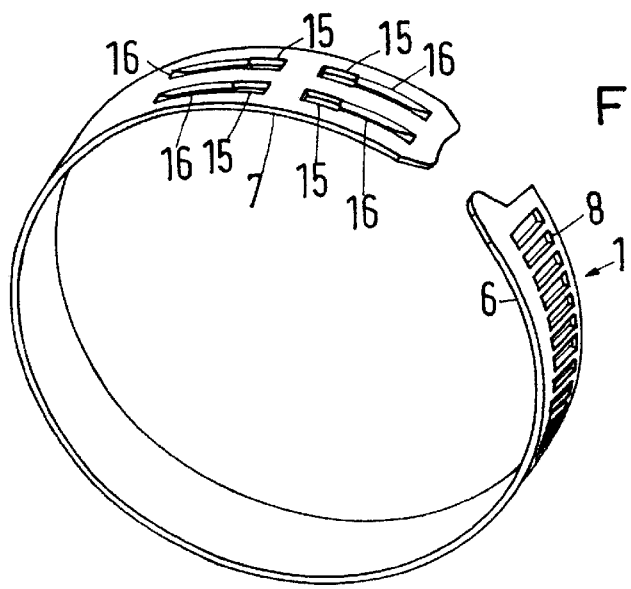
FIG. 16 is a perspective view of the clamping strip of the worm-driven hose clamp according to the invention in the open state.

The illustrated worm-driven hose clamp is comprised of a clamping strip 1, a housing 2, and a clamping screw 3 with a right-hand thread having a head 4 and a threaded shaft 5. The clamping strip 1 has ends 6 and 7 which overlap in the circumferential direction of the hose clamp wherein the radially outer end 6 is provided with thread elements 8 in the form of substantially axially extending ribs that are pressed out of the clamping strip 1 and engage the threaded shaft 5. The radially inwardly positioned end 7 is connected positive-lockingly with the bottom 9 of the housing 2 surrounding the ends 6, 7 and the threaded shaft 5. The housing 2 supports the clamping screw 3 in both circumferential directions of the hose clamp and is comprised of a housing band 10 whose ends are positive-lockingly connected in the area of the bottom 9 along an open butt joint 11 (FIGS. 10 and 11). The positive-locking connection is formed by interlocking undercuts of the two edges delimiting the open butt joint 11 of the housing band 10. The interlocking undercuts are comprised, on the one hand, of a hammerhead-shaped projection 12 at one end of the housing band 10 and, on the other hand, by a hammerhead-shaped cutout 13 matching the projection at the other end of the housing band 10 (FIGS. 10 and 11). Instead of the hammerhead-type connection 12, 13, it is also possible to provide a dovetail connection.

The bottom 9 of the housing 2 has at its transverse edges on both sides of the open butt joint 11, respectively, a radially outwardly angled tongue 14 projecting, respectively, through an opening 15 correlated with the tongue 14 and provided in the radially inner end 7 of the clamping strip 1. Moreover, each tongue engages matchingly a radially inwardly pressed depression 16 extending away from the respective bottom edge in the circumferential direction of the clamping strip 1, wherein the depression 16 adjoins an opening 15, respectively.

As can be seen particularly in FIGS. 4 and 10, the tongues 14 are pressed radially outwardly away from the underside of the housing bottom 9.

The radially outer corners of the free ends of the tongues 14 are beveled so that they do not project radially outwardly past the radially outer edge of the recesses or grooves formed by the depressions 16 and therefore do not impair movement of the radially outer end 6 across the tongues 14.

Moreover, the housing bottom 9 has on both sides of the open butt joint 11 projections 17 projecting past its inner side which project into the openings 15 in the end 7 of the hose clamp strip 1 positioned closest to the head 4 of the screw 3.

The projections 17 are formed by tabs which are produced by U-shaped cuts 18 in the bottom 9 and are pressed out of the plane of the bottom 9. With their free ends the tabs (17) rests against the edges of the openings 15 farthest away from the open butt joint 11.

The housing 2 has only on its right side, which is defined when the clamping screw 3 positioned above the clamping strip 1 and viewed in the direction from the head 4 to the shaft 5 of the clamping screw 3, a lateral stabilizer portion 19 whose wall, radially outwardly of the radially outer end 6 of the clamping strip 1 adjacent to the free end of the clamping screw shaft 5, has a slanted wall portion 22 connecting the rounded top 20 of the housing 2 tangentially with a radial wall portion 21 of the lateral stabilizer portion 19. Moreover, the lateral stabilizer portion 19 has adjacent to a central portion of the shaft 5 of the clamping screw 3 a curved wall portion 23 resting against the shaft 5 and an axial wall portion 24 connecting the curved wall portion 23 with the radial wall portion 21.

The curved wall portion 23 and the axial wall portion 24 are formed by pressing the sidewall of the housing 2 inwardly. By doing so, a transversely extending wall portion 25, positioned transversely to the clamping screw 3, is formed between the slantedly extending wall portion 22, the curved wall portion 23, and the axial wall portion 24.

The plane of the transversely extending wall portion 25 intercepts approximately the center of the section of the clamping screw engaging with its thread the clamping strip 1.

The lower edge of the depressions 16 is substantially aligned with the underside of the housing bottom 9, and the depth of the depressions 16 decreases continuously to zero from the end adjacent to the respective opening 15 toward the opposite end. This results in a substantially continuous transition between the housing bottom 9 and the inner side of the clamping strip 1 with a corresponding uniform clamping pressure distribution by means of the worm-driven hose clamp about the circumference of a hose to be clamped onto a socket or the like.

Figure 17:
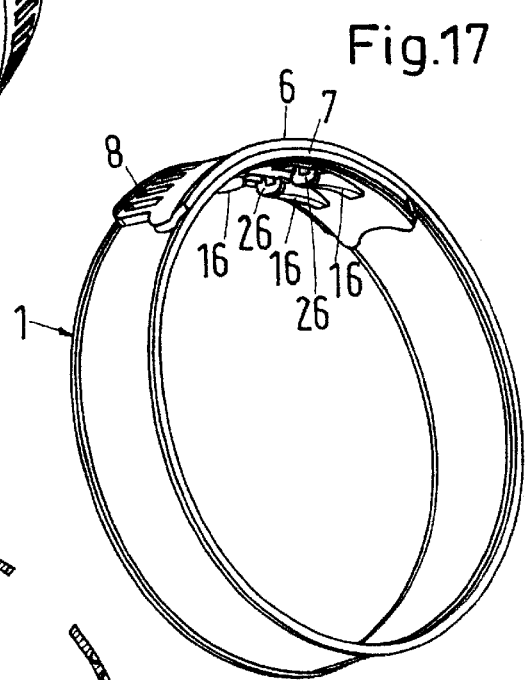
FIG. 17 is a perspective view of the clamping strip of the worm-driven hose clamp according to the invention in the coiled state.
Figure 18:
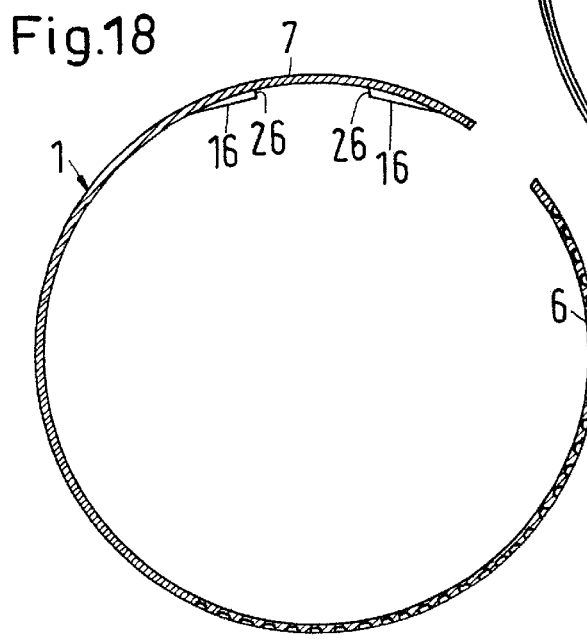
FIG. 18 shows section XVIII—XVIII of FIG. 19.
Figure 19:
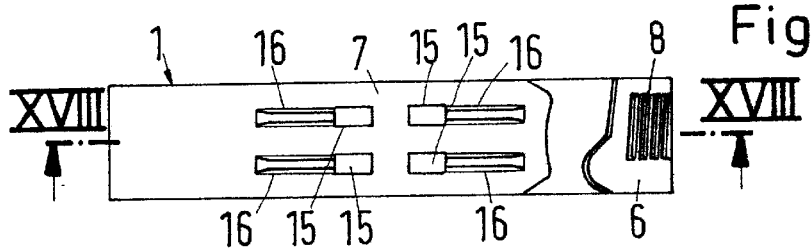
FIG. 19 shows a plan view onto the clamping strip of the worm-driven hose clamp according to the invention in the open state.

In this worm-driven hose clamp, the transverse edges of the housing bottom, during clamping or releasing of the worm-driven hose clamp, are supported in the circumferential direction of the hose clamp on the free radial end faces of the opening edges 26 of the depressions 16 on both sides of the tongues 14 (FIGS. 4, 17, 18). Thus, a total of four surfaces per transverse edge is provided. These support surfaces are thus overall greater than in the known embodiment (DE 196 33 435 C1), in which the transverse edges of the housing bottom 9 are supported only on two surfaces, positioned adjacent to each tongue pair, of an opening for receiving the tongue pair provided in the sidewall of the transverse groove provided within the hose clamps. Accordingly, the surface pressure on the edges of the depression opening and the transverse edges of the housing bottom is smaller and the connection to the housing bottom 9 and the clamping strip 1 can be loaded with a higher clamping force in the circumferential direction of the clamping strip without material deformation. Moreover, the tongues 14 contribute by engagement of the depressions 16 to the stability of the connection of the two ends of the housing band 10 in the area of the open butt joint 11. In addition, the projections 17 engaging the openings 15 of the radially inner end 6 of the strip 1 contribute to the stability of the connection of the housing band ends on the side of the housing bottom 9 at the side closest to the clamping screw head 4 which is loaded strongest in the transverse direction (axially). Since the tongues 14 are pressed radially outwardly away from the underside of the housing bottom 9, a substantially continuous transition between the underside of the housing bottom 9 and the radially inwardly positioned edge of the depression 16 results. The transverse edges of the housing bottom 9 can thus also be supported in the circumferential direction of the clamping strip 1 on the radially inner area of the opening edges 26 of the depressions 16.

The lateral stabilizer portion 19 prevents a lateral tilting of the housing 2 when turning the clamping screw 3 to the right when the worm-driven hose clamp is tensioned because the clamping screw 3, on the one hand, has a tendency to roll with its threaded shaft 5 on the surface of the radially outer end 6 and, on the other hand, as a result of the slanted thread elements 8, is forced with an axial force component to the side in the direction toward the lateral stabilizer portion 19. The force which is exerted during tightening of the clamping screw 3 on the right housing wall (FIG. 5) has a tendency to bend the curved wall portion 23 to the right in the outward direction, i.e., to stretch it, but this is prevented by the axial wall portion 24 and the transversely extending wall portion 25 up to very high clamping forces. Even though the clamping screw head 4 with its flange 27 engages across the opening edge of the housing 2 in order to prevent a rotation of the clamping screw about an axial transverse axis during clamping, which would cause the head 4 of the clamping screw 3 to move toward the clamping strip 1, such a rotation could not be excluded when very high clamping forces occur. For this reason, not only one sidewall 28 of the housing 2 is approximately planar, i.e., is not pressed toward the clamping screw 3 like the oppositely positioned sidewall between the wall portion 23 and 24, but the slanted wall portion 22 is also formed to be straight, i.e., without a depression. This wall portion 22 ensures thus additionally that the housing 2, on the one hand, cannot widen and, on the other hand, cannot yield to the torque of the clamping screw 3 about its axial transverse axis.

Moreover, the presence of the slanted wall portion 22 results in a spacing between an end portion of the threaded shaft 5 of the clamping screw 3, the end portion having a length that matches the width of the slanted wall portion 22, and the wall portion 22 such that the thread of the screw 3 will not come into contact with the housing in the area of the slanted portion 22 and thus experiences contact wear to a lesser degree. The clamping screw 3 is therefore easily actuatable for an extended period of time even after several actuations and exertion of a high clamping force.

Since the transversely extending wall portion 25 of the lateral stabilizer portion 19 is positioned substantially at the center of the section of the threaded shaft 5 of the clamping screw 3 engaging the thread elements 8 of the end 6, this portion of the housing, which is most strongly loaded in the transverse direction of the housing 2, is very stiff so that it cannot be widened by the clamping screw 3 even when very high clamping forces are exerted.

The corners 29 of the housing end facing away from the head 4 of the clamping screw 3 are rounded so that they cannot easily penetrate into the clamped hose material and, accordingly, cannot damage it.

The end portion of the housing 2 positioned at the head 4 of the clamping screw 3 is provided with tabs 30 and 31 at its radially inner edges. The tabs 30, 31, after introduction of the clamping screw 3 into the housing 2, are bent under the neck of the clamping screw 3 which is without thread in order to thus prevent a return movement of the clamping screw 3 relative to the housing 2 during opening (releasing)

of the worm-driven hose clamp upon reverse rotation of the clamping screw 3.

While specific embodiments of the invention have been shown and described in detail to illustrate the inventive principles, it will be understood that the invention may be embodied otherwise without departing from such principles.

What is claimed is:

1. A worm-driven hose clamp comprising:
   a housing (2) having a bottom (9) and comprised of a housing band (10) having opposed ends with an edge, respectively, wherein a first one of the edges has a cutout (13) and a second one of the edges has a matching projection (12), wherein the cutout and the projection (12, 13) are configured to interlock and connect the opposed ends by forming an open butt joint (11);
   a clamping screw (3), having a head (4) and a threaded shaft (5), wherein the threaded shaft (5) is arranged in the housing (2);
   a clamping strip (1) having a first end (6) and a second end (7) received in the housing (2), wherein the first end (6) overlaps the second end (7) in a circumferential direction of the clamping strip (1) and is positioned radially outwardly of the second end (7);
   the first end (6) having thread elements (8) interacting with the threaded shaft (5);
   the second end (7) positive-lockingly connected to the bottom (9) of the housing (2);
   the bottom (9) having a first transverse edge, positioned opposite the head (4) of the clamping screw (3), and a second transverse edge, positioned proximal to the head (4) of the clamping screw, wherein the first and second transverse edges extend transversely to the open butt joint (11), wherein at least the first transverse edge has two radially outwardly and circumferentially projecting tongues (14) positioned on opposite sides of the open butt joint (11);
   the second end (7) having openings (15), wherein the openings (15) are positioned on opposite sides of the open butt joint (11) at least in the area of the first transverse edge and are configured to receive the tongues (14);
   the second end (7) having depressions (16) adjoining the openings (15), respectively, wherein the depressions (16) project radially inwardly and extend longitudinally in a circumferential direction of the clamping strip (1) away from the housing (2) relative to the first and second transverse edges, respectively;
   the tongues (14) penetrating the openings (15) and matchingly engaging the depressions (16), respectively.

2. The worm-driven hose clamp according to claim 1, wherein the tongues (14) are bent radially outwardly away from an underside of the bottom (9).

3. The worm-driven hose clamp according to claim 1, wherein the bottom (9) has inwardly extending projections formed by tabs (17) on opposite sides of the open butt joint (11), wherein the projections (17) engage the openings (15) provided in the area of the second transverse edge.

4. The worm-driven housing according to claim 3, wherein the bottom (9) has U-shaped cuts (18) and wherein the tabs (17) defined by the U-shaped cuts (18) are bent radially inwardly to form the projections (17), wherein the openings (15) provided in the area of the second transverse edge have edges remote from the open butt joint (11), and wherein the tabs (17) have free ends resting against the edges remote from the open butt joint (11), respectively.

5. The worm-driven hose clamp according to claim 1, wherein:
   the housing (2) has a rounded top (20) and a lateral stabilizer portion (19);
   the lateral stabilizer portion (19) is arranged only on the right side of the housing (2), the right side being defined when the clamping screw (3) being positioned above the clamping strip (1) and viewed in a direction from the head (4) to the shaft of the clamping screw (3);
   the lateral stabilizer portion (19) has an outwardly positioned radial wall portion (21) and a slanted wall portion (22) extending tangentially relative to the clamping screw (3) and connecting the rounded top (20) and the radial wall portion (21);
   the slanted wall portion (22) is located radially outwardly of the first end (6) of the clamping strip (1) and adjacent to the free end of the threaded shaft (5) remote from the head (4) of the clamping screw (3);
   the lateral stabilizer portion (19) has a curved wall portion (23) located adjacent to the slanted wall portion (22), when viewed in an axial direction of the the lateral stabilizer portion has an axial wall portion connecting the curved wall portion and the radial wall portion.

6. The worm-driven hose clamp according to claim 5, wherein the lateral stabilizer portion comprises a transverse wall extending transversely to the axial direction of the threaded shaft and connecting the curved wall portion, the axial wall portion, and the slanted wall portion, wherein the transverse wall is formed by pressing a sidewall of the housing inwardly.

7. The worm-driven hose clamp according to claim 6, wherein the plane of the transverse wall intercepts substantially a center of that section of the clamping screw, which section is threadingly engaging the clamping strip.

8. The worm-driven hose clamp according to claim 1, wherein the housing has rounded corners at an end of the housing opposite the head of the clamping screw.

9. The worm-driven hose clamp according to claim 1, wherein the tongues (14) have free ends with beveled, radially outwardly positioned corners.

10. The worm-driven hose clamp according to claim 1, wherein the depressions (16) have lower edges aligned substantially with the underside of the bottom (9), and wherein the depressions (16) have a depth decreasing to zero in a direction away from the openings (15).

* * * * *